United States Patent [19]

Yang

[11] 4,153,134
[45] May 8, 1979

[54] UNDERWATER SEISMIC SOURCE

[75] Inventor: Lien C. Yang, La Canada, Calif.

[73] Assignee: The United States of America as represented by the Administrator of the National Aeronautics and Space Administration, Washington, D.C.

[21] Appl. No.: 830,458

[22] Filed: Sep. 6, 1977

[51] Int. Cl.² ............................................. G01V 1/38
[52] U.S. Cl. ................................. 181/120; 340/12 R; 181/115
[58] Field of Search ...................... 181/115, 118, 120; 340/12 R; 175/1; 166/299

[56] References Cited

U.S. PATENT DOCUMENTS

| 2,069,242 | 2/1937 | Graham | 340/12 R |
| 3,039,559 | 6/1962 | Ellsworth | 340/12 R |
| 3,176,787 | 4/1965 | Roever | 340/12 R |
| 3,444,953 | 5/1969 | Cholet | 181/115 |
| 3,588,801 | 6/1971 | Leonard | 181/115 |
| 3,620,327 | 11/1971 | Savit | 181/118 |
| 3,658,005 | 4/1972 | Byrne | 340/12 R |
| 3,740,708 | 6/1973 | Phillips | 181/120 |

FOREIGN PATENT DOCUMENTS 2300346  8/1976  France ...................... 181/120

Primary Examiner—Howard A. Birmiel
Attorney, Agent, or Firm—Monte F. Mott; John R. Manning; Wilfred Grifka

[57] ABSTRACT

Apparatus for generating a substantially oscillation-free siesmic signal for use in underwater petroleum exploration, including a bag with walls that are flexible but substantially inelastic, and a pressured gas supply for rapidly expanding the bag to its fully expanded condition. The inelasticity of the bag permits the application of high pressure gas to rapidly expand it to full size, without requiring a venting mechanism to decrease the pressure as the bag approaches a predetermined size to avoid breaking of the bag.

5 Claims, 6 Drawing Figures

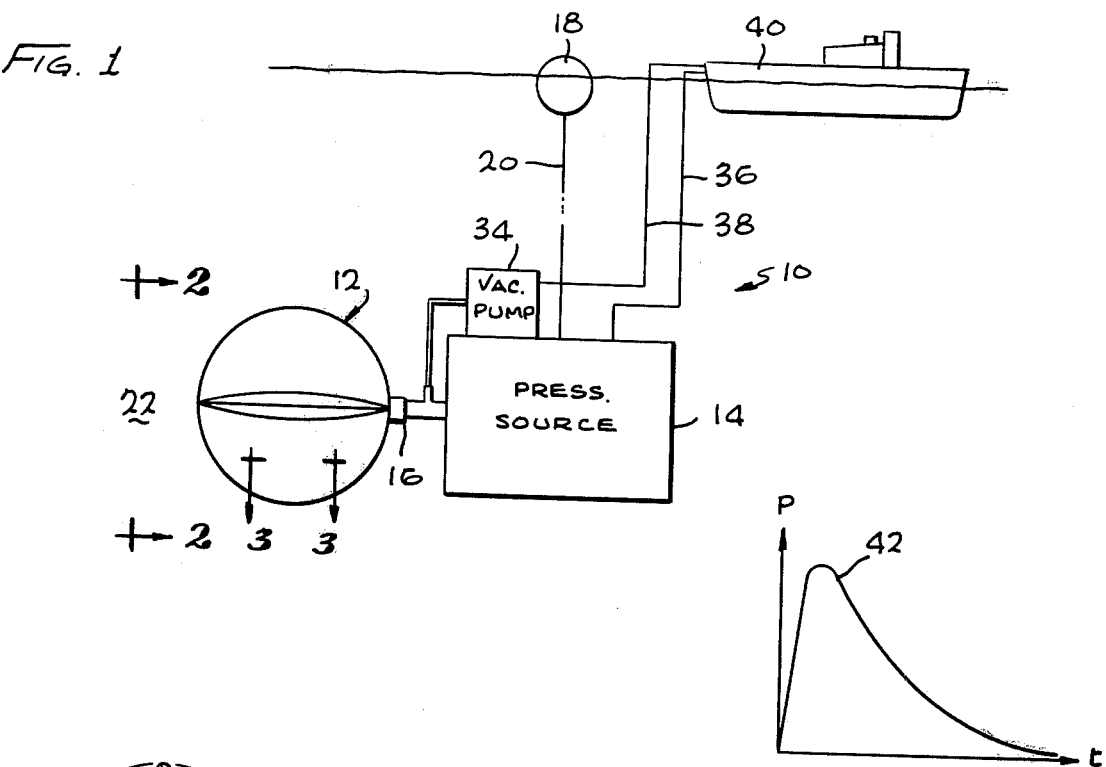
FIG. 1
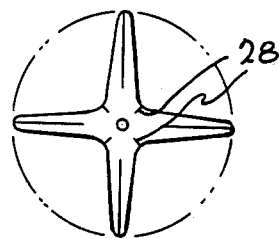
FIG. 2
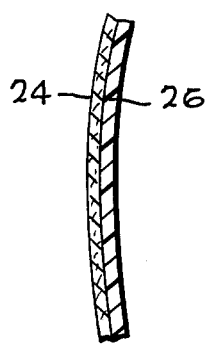
FIG. 3
FIG. 4
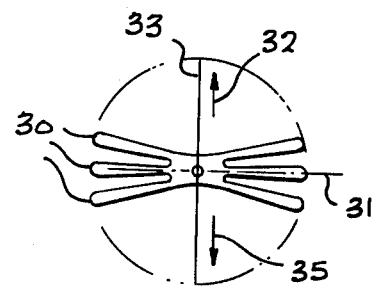
FIG. 5
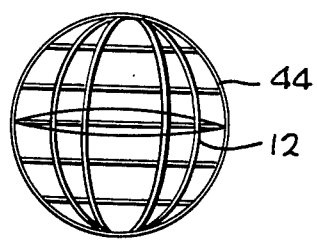
FIG. 6

UNDERWATER SEISMIC SOURCE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to siesmic signal sources.

The exploration for underwater petroleum deposits can involve siesmic mapping that is conducted by generating an underwater shock wave or other siesmic signal, and recording the reflections of the accoustic wave. A clean high amplitude pulse which is free of oscillations that can mimic reflections of sound waves, is highly desirable in many situations. One way to produce an underwater pulse is to rapidly expand a rubber enclosure by punping high pressure air therein. However, rapid expansion requires a much larger pressure within the enclosure than in the surrounding water, and such pressure difference can cause bursting of the rubber enclosure and therefore prevent its reuse. Such bursting can be avoided by venting the pressured gas as the enclosure reaches its full expansion configuration. However, such venting is hard to control, and typically results in the enclosure rapidly decreasing in size which results in the generation of bubbles that soon burst and produce subsidiary oscillations. A reusable underwater siesmic signal apparatus which could produce a rapid expansion of the container without rapid decreases in the container size, would be of considerable value in underwater siesmic mapping.

SUMMARY OF THE INVENTION

In accordance with one embodiment of the present invention, an apparatus for generating underwater siesmic signals is provided which can produce relatively oscillation-free signals. The apparatus includes a flexible bag and means for rapidly supplying gas to the bag to expand it. The bag has walls that are flexible but substantially inelastic, so that the bag will not expand more than a predetermined amount and therefore will not break in spite of a considerable pressure difference between gas in the bag and water outside the bag. The bag walls can comprise an inner layer of rubber material for sealing in the gas, and an outer layer of a flexible but substantially inelastic material such as a metal or Kavlar cloth. The bag can have a substantially spherical shape when expanded to provide large strength, and the sphere can be folded into a cruciform cross-section when contracted. In order to further strengthen a bag against breakage when in its fully expanded condition, a frame can be positioned about the bag, which is substantially open and inexpandable to engage the bag when it is fully inflated so as to prevent further outward movement of areas of the bag.

The novel features of the invention are set forth with particularity in the appended claims. The invention will be best understood from the following description when read in conjunction with the accompanying drawings.

BRIEF DESCRIPTION OF THE DRAWINGS

FIG. 1 is a side elevation view of an underwater siesmic source, showing it in use in a body of water.

FIG. 2 is a view taken on the line 2—2 of FIG. 1.

FIG. 3 is a view taken on the line 3—3 of FIG. 1.

FIG. 4 is a graph showing the type of siesmic signal which can be generated by the apparatus of FIG. 1.

FIG. 5 is a plan view of the flexible bag of FIG. 1, but showing it folded into another configuration.

FIG. 6 is a perspective view of a frame which can be utilized with the apparatus of FIG. 1.

DESCRIPTION OF THE PREFERRED EMBODIMENTS

FIG. 1 illustrates a siesmic signal generating apparatus 10 which includes a flexible bag 12 and a pressure source 14 which is connected through a coupling 16 to the bag to inflate it. The apparatus is coupled to a buoy 18 by a cable 20 that supports the apparatus at a predetermined depth within the body of water in which the bag lies.

In order to create a pressure pulse in the water 22 surrounding the bag, the valve 16 is suddenly open to transfer gas from the pressure source 14 to the bag to rapidly expand the bag. The rapid expansion of the bag causes it to push water outwardly away from the center of the bag, to produce a pressure pulse, with a component thereof directed downwardly towards the earth structure which lies under the water. The walls of the bag 12 are constructed, as shown in FIG. 3, of an outer layer 24 of a flexible but substantially inelastic material, such as a cloth woven of metal strands or strands of Kavlar, which produces a container which is flexible but substantially inelastic. The walls also include an inner layer 26 of rubber or the like which is useful for sealing the bag against the loss of gas therefrom. Although the inner layer 26 may be elastic, the outer layer 24 will prevent expansion of the bag past a predetermined size.

The fact the the bag is substantially inelastic, as compared to one constructed only with ordinary rubber walls, means that the bag will not break when a high pressure gas is applied to expand the bag. The pressure applied to the bag to expand it, must be considerably greater than the pressure of the surrounding water 22, in order to cause rapid expansion of the bag. For example, a pressure differential of perhaps a few hundred pounds per square inch may be utilized between gas inside the bag and the pressure of the surrounding water, to create rapid bag expansion. If the bag were elastic, then such a pressure differential would cause continued expansion of the bag and breakage. To prevent such continued expansion, a venting system could be utilized to vent the gas as the bag reached a predetermined size, to prevent further bag expansion. However, such venting is difficult to accurately control, and may result in small but sudden decreases in the bag size that would produce bubbles in the surrounding water. The bubbles would soon collapse and produce secondary oscillations that result in the pressure pulse not being a clean single pulse without secondary oscillations. The present bag 12 is substantially inelastic so that when deployed it will not expand in diameter by more than a few percent for pressure differences on the order of 100 psi, so that a large pressure difference necessary to expand the bag will not cause breakage of the bag when it is fully expanded.

The bag 12 is constructed so that it is substantially a sphere when fully expanded. The spherical shape enables large amplitude pressure pulses to be produced, and also results in a bag of maximum strength for a given displacement and wall thickness. When not deployed, the bag can be folded to the configuration shown in FIGS. 1 and 2, wherein the bag is folded in a cruciform shape with four arms. This can be accomplished in a variety of ways, as by utilizing elastic bands 28 within the bag that pull the folded portions together when the bag does not contain high pressure gas. Another folding technique illustrated in FIG. 5, produces six folds 30. There are three folds at opposite ends of a first line 31, but substantially no folds at opposite ends of a perpendicular second line 33. The expansion of the bag of FIG. 5, produces large pressure pulses in directions 32, 35 away from the centerline of the folded bag, with the pulse in the direction 35 passing towards the floor of the body of water.

In a complete installation, a vacuum pump 34 can be provided to aid in evacuation of the bag as it is slowly collapsed. In a typical operation, control cables 36, 38 leading from a ship 40 will extend down to the pressure source 14 to operate it and the valve 16, and also to the vacuum pump 34. Where compressed air or the like is utilized, it is also possible to pump air from a ship down through hoses to a reservoir to repeatedly fill it.

Where the pressure source 14 supplies compressed air or the like to the bag to fill it, the air supplied to the bag will be cooler than the surrounding water, and therefore after expansion of the bag, the air will slowly heat and expand to slightly increase the pressure in the bag. Of course, during this time some of the air may be vented. Where a solid propellant or other gas generating apparatus is utilized, the gas in the bag may be hotter than the surrounding water, and therefore the gas will cool and decrease in pressure after the bag is expanded. However, the rate of pressure decease would be relatively slow and would not ordinarily be a problem. A pressure pulse as illustrated by the graph 42 of FIG. 4 can be produced by the expandable bag, with the pulse having a rapid rise time and a relatively slow decrease without appreciable oscillations.

FIG. 6 illustrates a cage or frame 44 that can be utilized to surround the bag 12 so as to aid in preventing expansion past a predetermined maximum size so as to prevent bursting of the bag. The cage 44 can be constructed of high strength wire of a material such as steel or a high strength plastic. The frame is primarily open, with the wire of the frame constituting a very small percentage of the total area of the sphere formed by the frame, so that water rapidly displaced by the rapidly expanding bag is not greatly retarded by the frame. It may be noted that such a frame can also be utilized with an elastic bag to prevent its expansion to more than a predetermined size.

Thus, the invention provides an apparatus for generating an underwater siesmic signal which is relatively oscillation-free. The apparatus can include a relatively inelastic bag and a pressure source for rapidly expanding the bag to its full size by applying gas to the bag which is at a higher pressure than that of the surrounding water. In a typical application, a bag of maximum diameter of a few feet may be utilized which contains gas at a pressure of a few hundred psi above that of the surronding water. A spherical bag can be utilized to maximize the strength of the bag for a bag of given value. A substantially open and inexpandable frame can be disposed about the bag to engage the fully inflated bag so as to strengthen it against further expansion, while allowing a bag with thinner walls to be utilized so as to facilitate the collapse of the bag. Where only a single use of the bag is sufficient, a pyrotechnic device such as solid rocket propellant can be provided within the collapsed bag, together with an igniter, to create gas that quickly expands the bag.

Although particular embodiments of the invention have been described and illustrated herein, it is recognized that modifications and variations may readily occur to those skilled in the art, and consequently, it is intended that the claims be interpreted to cover such modifications and equivalents.

I claim:

1. A method for generating an underwater seismic signal, comprising:
   surrounding a folded flexible bag by a substantially inexpandable and open frame;
   rapidly inflating said bag and rapidly expanding it until it presses on said frame; and
   collapsing said bag at a rate much slower than the rate at which it was inflated;
   said step of expanding including moving opposite sides of said bag rapidly towards opposite sides of said frame, wherein the center point of said bag will undergo substantially no displacement as a result of said expansion.

2. A method for generating an underwater seismic signal, comprising:
   collapsing a flexible but inelastic bag to a cruciform cross-section;
   rapidly inflating said cruciformally collapsed bag with gas to its fully expanded condition; and
   venting gas from said bag only after the bag has reached its fully expanded condition, and then venting the gas at a rate much lower than the rate of inflation.

3. Apparatus for generating an underwater seismic signal, comprising:
   a flexible bag; and
   means for rapidly supplying gas to said bag to expand it;
   said bag having walls that are flexible so that the bag can be collapsed to a small volume, but substantially inelastic so that the bag will not expand to more than a predetermined size;
   said bag having a cruciform cross-section when collapsed, and said bag being substantially spherical when expanded to said predetermined size to effectively resist breakage when rapidly inflated.

4. Apparatus for generating an underwater seismic signal, comprising:
   a flexible bag which can be contracted to a small volume and then expanded to a predetermined size without breaking;
   a substantially open cage surrounding said bag and of said predetermined size to engage the bag when it is expanded; and
   means for rapidly supplying a pressure medium to said bag to expand it;
   said bag when collapsed having opposite sides which can expand apart from one another, and said cage extending around a majority of the surface area of the expanded bag, to permit bag expansion in opposite directions without obstruction to the outflow of water by the expanding bag.

5. A method for generating an underwater seismic signal, comprising:
   maintaining a bag in a collapsed state wherein it has at least one fold at opposite ends of a first line but substantially no folds at opposite ends of a second line perpendicular to the first, each line passing through the center of the bag,
   rapidly inflating said bag with gas while allowing the bag portions at opposite sides along said second line to rapidly move apart wherein the center of said bag will undergo substantially no displacement as a result of said movement.

* * * * *